3,574,208
3-TERTIARYAMINO PROPIONYL-BENZO FURAN-2-CARBOXYLIC ACID
Janos Zergenyi, Riehen, and Ernst Habicht, Oberwil, Switzerland, assignors to Geigy Chemical Corporation, Ardsley, N.Y.
No Drawing. Filed July 22, 1968, Ser. No. 746,268
Int. Cl. C07d 87/36
U.S. Cl. 260—247.2          5 Claims

ABSTRACT OF THE DISCLOSURE 5-(2 - di(lower)alkylaminomethyl - (lower)alkanoyl) - benzofuran-2-carboxylic acids and their pharmaceutically acceptable salts with acids and bases are prepared by Mannich condensation of 5-lower-alkanoyl-substituted benzofuran-2-carboxylic acids with paraform-adehyde and secondary amines. A typical embodiment is 5-(2-dimethylaminomethyl - butyryl)-6-methyl-benzofuran-2-carboxylic acid hydrochloride. A method of producing a diuretic and a saluretic effect comprising administration of said compounds to warm-blooded animals as well as pharmaceutical compositions containing said compounds are provided.

The present invention concerns new heterocyclic amino carboxylic acids, processes for the production thereof, a method of producing diuresis and saluresis as well as pharmaceutical compositions. More particularly, the present invention relates to heterocyclic amino carboxylic acids of Formula I

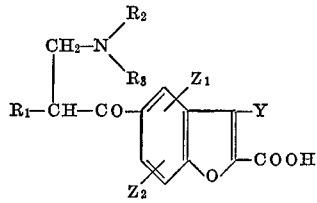

(I)

wherein:

$R_1$ is hydrogen or lower alkyl,
$R_2$ and $R_3$ are lower alkyl, or $R_2$ and $R_3$ taken together with the nitrogen atom to which they are attached are a heterocyclic ring having 5–7 ring members one of which is optionally oxygen; and
each of Y, $Z_1$ and $Z_2$ taken individually is hydrogen, or methyl, as well as to their pharmaceutically acceptable salts with acids or bases.

It has been found that the new compounds have valuable pharmacological properties. In particular, they have diuretic and saluretic activity. These properties characterise these compounds as suitable for the treatment of disturbances which are due to insufficient excretion of urine and of electrolytes, particularly of sodium chloride. Such disturbances are the cause of oedema and hypertension. These new substances increase considerably the excretion of urine and of sodium and chlorine ions in the dog and in the rabbit.

In the heterocyclic amino carboxylic acids of Formula I, $Z_1$ takes the 4- or 6-position and $Z_2$ the 6- or 7-position. By the term lower alkyl is intended a group comprising a straight or branched hydrocarbon chain of from 1 to 4 carbon atoms. Representative of lower alkyl groups are thus e.g. the methyl, ethyl, propyl, isopropyl, butyl or the tert. butyl group. $NR_2.R_3$, optionally with oxygen as ring member, can be, as saturated heterocyclic ring, e.g. the 1-pyrrolidino, 1-piperidino, 1-hexahydro-1H-azepino, or the morpholino group.

Compounds of Formula I are produced by reacting a compound of Formula II

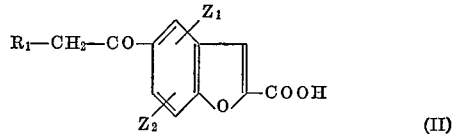

(II)

wherein $R_1$, Y, $Z_1$ and $Z_2$ have the meanings given in Formula I, according to Mannich with formaldehyde or paraformaldehyde and an amine of Formula III

(III)

wherein $R_2$ and $R_3$ or $NR_2.R_3$ have the meanings given in Formula I. If desired, the reaction product is converted into a pharmaceutically acceptable salt with an acid or a base. The Mannich reaction is preferably performed in a solvent. Suitable solvents are e.g. lower alkanols such as methanol, ethanol or isopropanol, or ether-type liquids such as dioxan.

The starting materials of Formula II are produced by acylating carboxylic acids of Formula IV

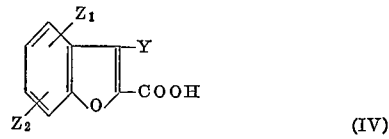

(IV)

wherein Y, $Z_1$ and $Z_2$ have the meanings given above. Such compounds are described in the literature, e.g. benzofuran-2-carboxylic acid [cf. R. Fittig et al., Ann. Chem. 216, 162 (1883)], 6-methyl-benzofuran-2-carboxylic acid [cf. K. von Auwers, Ann. Chem. 408, 255 (1915)] and 4,6-dimethyl-benzofuran-2-carboxylic acid (cf. F. M. Dean et al., J. Chem. Soc. 1953, 1250).

These compounds of Formula IV can be acylated in the 5-position, e.g. according to Friedel-Crafts in the presence of aluminum chloride in nitrobenzene with a carboxylic acid chloride of Formula V

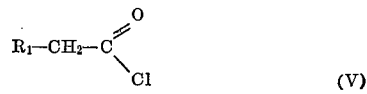

(V)

wherein $R_1$ has the meaning given in Formula I.

For the formation of pharmaceutically acceptable salts can be used inorganic or organic bases such as alkali or alkaline earth hydroxides, carbonates or bicarbonates, e.g. the sodium, potassium, magnesium or calcium derivatives, triethanolamine or chlorine, or inorganic or organic acids, e.g. hydrochloric acid, hydrobromic acid, sulfuric acid, phosphoric acid, methane sulfonic acid, ethane sulfonic acid, 3-hydroxy-ethane sulfonic acid, acetic acid, lactic acid, oxalic acid, succinic acid, fumaric acid, maleic acid, malic acid, tartaric acid, citric acid, benzoic acid, salicyclic acid, phenylacetic acid, mandelic acid and embonic acid. Such salts of bases are produced, e.g. by mixing the compound of Formula I with the equivalent amount of the desired base in a suitable solvent such as water, mixtures of water with an organic solvent or in organic solvents alone such as methanol, ethanol or propanol and isolating the salts formed in a conventional manner. Salts of acids are prepared in a similar way by mixing the compound of Formula I with the desired acid and isolating the salt in a conventional manner.

The compounds of the invention have been found to have valuable pharmacological properties, especially diuretic and saluretic activities combined with a very low order of toxicity. These favourable properties render the compounds of Formula I and their pharmaceutically acceptable salts with acids or bases suitable for the treatment of disturbances with are due to insufficient excretion of urine and of electrolytes, particularly of sodium chloride. Such disturbances are the cause of oedema and hypertension.

The diuretic and saluretic effects of the compounds of the invention are illustratively demonstrated in dogs and rabbits. Thus it can be shown by conventional pharmacological experiments that 5-(2-dimethylamino-methyl-butyryl)-6-methyl-benzofuran-2-carboxylic acid hydrochloride administered orally or parenterally in amounts of 5 mg./kg. to dogs and rabbits increase the excretion of urine and simultaneously of sodium and chlorine ions to a considerable extent. No noticeable side effects are observed.

The new active substances or the pharmaceutically acceptable salts therof are preferably administered orally. The daily dosages vary betwen 50 and 1,000 mg. for warm-blooded animals. Suitable dosage units such as dragees and tablets, preferably contain 25–500 mg. of an active substance according to the invention, i.e. 20–80% of a compound of Formula I. They are produced by combining the active substance with, e.g. solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols, to form tablets or dragee cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance.

Other suitable dosage units are hard gelatine capsules as well as soft closed capsules made from gelatine and a softener, such as glycerine. The hard gelatine capsules preferably contain the active substance as a granulate, e.g. in admixture with fillers such as maize starch, and/or lubricants such as talcum or magnesium stearate and, optionally, stabilisers such as sodium metabisulfite ($Na_2S_2O_5$) or ascorbic acid. In soft gelatine capsules, the active substance is preferably dissolved or suspended in suitable liquids such as liquid polyethylene glycols to which stabilisers can also be added.

The following examples further illustrate the production of the new compounds of Formula I and of hitherto undescribed intermediate products as well as the production of pharmaceutical compositions, but these are by no means the sole methods of producing same. The temperatures are given in degrees centigrade.

EXAMPLE 1

(a) A mixture of 4 g. of 5-butyryl-6-methyl-benzofuran-2-carboxylic acid, 0.82 g. of paraformaldehyde, 1.64 g. of dimethylamine hydrochloride and 40 ml. of dioxan is stirred and refluxed for 5 hours. The mixture is cooled, and the precipitate is filtered off and recrystallised from ethanol water to give 5-(2-dimethylaminomethyl-butyryl)-6-methyl-benzofuran-2-carboxylic acid hydrochloride; M.P. 187–188°.

In an analogous manner as described above are prepared (b) 5-(2-dimethylaminomethyl - butyryl)-benzofuran-2-carboxylic acid hydrochloride, M.P. 191–193° (ethanol/ether), from 5-butyryl-benzofuran-2-carboxylic acid, paraformaldehyde and dimethylamine hydrochloride;

(c) 5 - (2-piperidinomethyl-butyryl)-6-methyl-benzofuran-2-carboxylic acid hydrochloride, M.P. 180–183° (ethanol), from 5-butyryl-6-methyl-benzofuran-2-carboxylic acid, paraformaldehyde and piperidine hydrochloride;

(d) 5 - (2-morpholinomethyl-butyryl)-6-methyl-benzofuran-2-carboxylic acid hydrochloride, M.P. 175–177° (ethanol) from 5-butyryl - 6 - methyl-benzofuran-2-carboxylic acid, paraformaldehyde and morpholine;

(e) 5 - (3-dimethylamino-propionyl)-6-methyl-benzofuran-2-carboxylic acid hydrochloride, M.P. 225–227° (ethanol/water), from 5-acetyl-6-methyl-benzofuran-2-carboxylic acid, paraformaldehyde and dimethylamine hydrochloride;

(f) 5 - (2-dimethylaminomethyl-propionyl)-6-methyl-benzofuran-2-carboxylic acid hydrochloride, M.P. 195–197°, (ethanol/water) from 5-acetyl-6-methyl-benzofuran-2-carboxylic acid, paraformaldehyde and dimethylamine hydrochloride.

The starting material 5-butyryl-6-methyl-benzofuran-2-carboxylic acid is produced as follows:

(g) To a stirred suspension of 10 g. of 6-methyl-benzofuran-2-carboxylic acid in 30 ml. of nitrobenzene is added at 0° in portions 28 g. of pulverised aluminum chloride whereby care is taken that the temperature remains below 10°. Butyryl chloride (9 g.) is dropped into the mixture at 10° whereupon stirring is continued for 24 hours at room temperature. The mixture is then poured on 300 g. of ice and 50 ml. of concentrated hydrochloric acid and the resulting suspension is extracted with ether. The organic phase is washed with water and reextracted with aqueous sodium hydrogen carbonate solution. The sodium hydrogen carbonate solution is adjusted to pH 3 with concentrated hydrochloric acid and stirred for one hour whereupon a precipitate is formed which is filtered, washed with water and dissolved in ethyl acetate. This organic solution is dried and evaporated in vacuo. The residue is recrystallised from ethylacetate/dioxan to give 5-butyryl-6-methyl-benzofuran-2-carboxylic acid, M.P. 155–157°.

In analogous manner as described above are prepared the following starting materials:

(h) 5-butyryl-benzofuran-2-carboxylic acid, M.P. 179–181° (benzene) from benzofuran-2-carboxylic acid, butyryl chloride, and aluminum chloride;

(i) 5 - acetyl - 6 - methyl-benzofuran-2-carboxylic acid, M.P. 228–230° (ethanol), from 6-methylbenzofuran-2-carboxylic acid, acetylchloride and aluminum chloride.

(j) 5-propionyl-6-methyl-benzofuran-2-carboxylic acid, M.P. 180–182° (dioxan), from 6-methyl-benzofuran-2-carboxylic acid, propionyl chloride and aluminum chloride.

EXAMPLE 2

1,000 g. of 5-(2-dimethylaminomethyl-butyryl)-benzofuran-2-carboxylic acid hydrochloride are mixed with 500 g. of lactose and 270 g. of potato starch, the mixture is moistened with an aqueous solution of 8 g. of gelatine and granulated through a sieve. After drying, 60 g. of potato starch, 60 g. of talcum, 10 g. of magnesium stearate and 20 g. of colloidal silicon dioxide are mixed in and the mixture is pressed into 10,000 tablets each weighing 20 mg. and containing 100 mg. of active substance. If desired, the tablets can be grooved for better adaptation of the dosage.

EXAMPLE 3

A granulate is produced from 1,000 g. of 5-(2-dimethylaminomethyl - butyryl) - benzofuran - 2-carboxylic acid hydrochloride, 345 g. of lactose and the aqueous solution of 6 g. of gelatine. After drying, the granulate is mixed with 10 g. of colloidal silicon dioxide, 40 g. of talcum, 40 g. of potato starch and 5 g. of magnesium stearate and the mixture is pressed into 10,000 dragée cores. These are then coated with a concentrated syrup consisting of 533 g. of crystallised saccharose, 20 g. of shellac. 75 g. of gum arabic, 250 g. of talcum, 20 g. of colloidal silicon dioxide and 1.5 g. of dyestuff, and dried. The dragées obtained each weigh 240 mg. and contain 100 mg. of active substance.

What we claim is:

1. A compound of the formula:

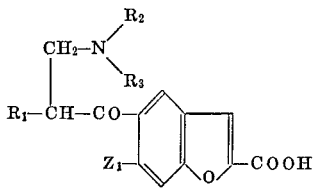

wherein $R_1$ is hydrogen or lower alkyl of 1 to 4 carbon atoms;
$R_2$ and $R_3$ taken independently are lower alkyl of 1 to 4 carbon atoms or taken together are pyrrolidino, piperidino, hexahydro-1H-azepino or morpholino; and $Z_1$ is hydrogen or methyl, or a pharmaceutically acceptable salt thereof.

2. A compound according to claim 1 which compound is 5 - (2 - dimethylaminomethyl-butyryl)-6-methyl-benzofuran-2-carboxylic acid.

3. A compound according to claim 1 which compound is 5-(2-piperidinomethyl-butyryl)-6-methyl-benzofuran-2-carboxylic acid.

4. A compound according to claim 1 which compound is 5-(2-morpholinomethyl-butyryl)-6-methyl-benzofuran-2-carboxylic acid.

5. A compound according to claim 1 which compound is 5-(2-dimethylaminomethyl-propionyl)-6-methyl-benzofuran-2-carboxylic acid.

No references cited.

ALEX MAZEL, Primary Examiner

J. TOVAR, Assistant Examiner

U.S. Cl. X.R.

260—294, 326.3, 346.2; 424—248, 267, 274, 285